No. 627,042. Patented June 13, 1899.
E. M. BIRDSALL.
WHEEL RIM.
(Application filed Aug. 4, 1898.)
(No Model.)
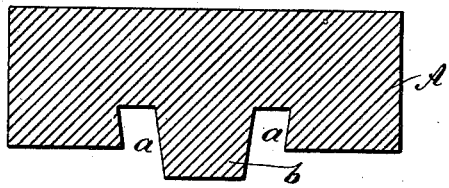
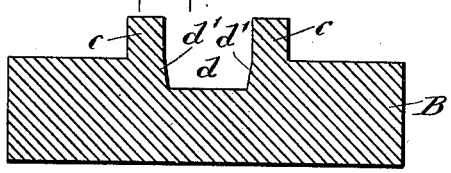
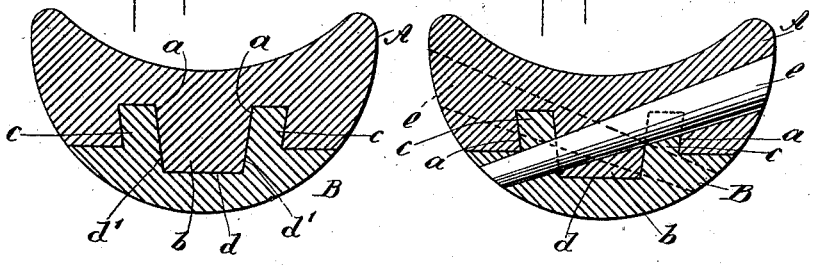
WITNESSES:
INVENTOR
E. M. Birdsall
BY
ATTORNEYS.

UNITED STATES PATENT OFFICE.

EDGAR M. BIRDSALL, OF BUFFALO, NEW YORK, ASSIGNOR OF ONE-HALF TO THOMAS S. KELLET, OF TROY, NEW YORK.

WHEEL-RIM.

SPECIFICATION forming part of Letters Patent No. 627,042, dated June 13, 1899.

Application filed August 4, 1898. Serial No. 687,705. (No model.)

*To all whom it may concern:*

Be it known that I, EDGAR M. BIRDSALL, of Buffalo, in the county of Erie and State of New York, have invented a new and Improved Wheel-Rim, of which the following is a full, clear, and exact description.

This invention relates to a rim adapted especially to bicycle-wheels of the class used with a rubber tire and metallic spokes.

This specification is the disclosure of one form of my invention, while the claims define the actual scope of the invention.

Reference is to be had to the accompanying drawings, forming a part of this specification, in which similar characters of reference indicate corresponding parts in all the figures.

Figure 1 is a sectional view of the outer part of the rim. Fig. 2 is a similar view of the inner part of the rim. Fig. 3 is a sectional view of the rim in the finished state, and Fig. 4 is a similar view of the rim having strengthening-dowels.

The rim is constructed of two wooden strips, an outer section A and an inner section B. These sections are first produced in the form of strips having cross-sectional shapes corresponding, respectively, to Figs. 1 and 2 and in lengths equal to the circumference of the rim to be constructed. They are then bent in circular form and afterward joined together, as will be hereinafter fully described. This forms the blank from which the finished rim is produced. The section A has its under face formed with two grooves $a$, which run throughout the length of the section parallel with each other and which, as best shown in Fig. 1, are slightly undercut toward the respective edges of the strip A, their inner side walls being each extended to form a tongue $b$, running longitudinally with the strip between the grooves $a$.

The strip B is provided on its upper face with two parallel ribs $c$, between which is formed a groove $d$, such groove having inwardly-inclined walls $d'$, respectively matching with the inclined walls of the rib $b$. The ribs $c$ before the connection of the strips A and B with each other stand perpendicularly to the upper face of the strip B, as may be seen in Fig. 2, and are in width equal to the width of the grooves $a$.

To assemble or connect the two strips, they are first bent in circular form, after which the surfaces to be joined are coated with cement or glue and the inner strip placed within the outer in such a manner that the rib $b$ enters the groove $d$ and so that the ribs $c$ respectively pass on the sides of the rib $b$ and enter the grooves $a$. This causes the walls of the ribs $c$, which are adjacent to the groove $d$, to be spread apart respectively in the planes of the walls $d'$, and thus form a snug and secure seat for the entire area of the sides of the rib $b$, as may be seen best in Fig. 3. In this manner the structure is forced into perfect contact, with a dovetail formation, by subjecting it to a powerful pressure by a machine which arbitrarily holds it to the required outer circumference, while the pressure from within is so great that the connection of the two circular strips is made secure and immovable. The strips thus joined may be subjected to the action of tools to give them the cross-sectional form shown in Fig. 3, which is that of the ordinary bicycle-rim.

As shown in Fig. 4, the rim may be strengthened by the application of dowel-pins $e$, passed diagonally either entirely through the rim, as represented in Fig. 4, or only partially through and cemented or glued therein. This will prevent the rim from splitting when subjected to severe strain.

Having thus described my invention, I claim as new and desire to secure by Letters Patent—

1. A wheel-rim, formed of two strips of flexible material bent into circular form and arranged the one within the other, the outer strip having its inner face formed with a tongue running longitudinally throughout the strip, and said inner face of the outer strip also having an undercut groove at each side of the tongue, the grooves being undercut in opposite directions, and the side walls of the tongue being inclined so as to lie parallel with the walls of the grooves respectively adjacent thereto, and the inner face of the inner strip being formed with two tongues running longitudinally throughout the strip, such tongues normally standing perpendicular to the face of the outer strip and being separated from each other by a longitudinally-extending groove, and the tongues of the inner strip being adapted to enter the grooves of the outer strip and to engage the inclined walls of the tongue of the outer strip, whereby to spread the tongues of the inner strip into the undercut grooves and thus fasten the two sections together.

2. A wheel-rim, formed of two flexible strips bent into circular form and arranged the one within the other one strip being formed with a longitudinally-extending tongue running throughout the length thereof, and having on each side thereof an undercut groove, the grooves being undercut in opposite directions, and the other strip being formed with two longitudinally-extending tongues between which is formed a groove, the groove of the first strip receiving the tongue of the second strip, and the tongues of the second strip being forced into the undercut grooves of the first strip, the two strips having plane faces engaging directly with each other and located respectively on the sides of the several tongues and grooves.

3. A wheel-rim formed of two strips, one of which has two longitudinally-extending undercut grooves between which is a longitudinal tongue, the other strip being provided with two longitudinal tongues located one on each side of a longitudinal groove, the tongues and grooves of the second strip being respectively adapted to engage with the grooves and tongues of the first strip in such manner as to form a dovetail connection.

EDGAR M. BIRDSALL.

Witnesses:
RAYMOND LYON,
ROBERT S. GAIL.